(12) United States Patent
Stephan et al.

(10) Patent No.: US 11,236,510 B2
(45) Date of Patent: Feb. 1, 2022

(54) ROOF ATTACHMENT PAN FOR SOLAR ENERGY PANELS

(71) Applicant: PEGASUS SOLAR, INC., Richmond, CA (US)

(72) Inventors: Erich Kai Stephan, Richmond, CA (US); Glenn Harris, Sausalito, CA (US); Nicholas Wenzel, Richmond, CA (US); Peter Wilke, Richmond, CA (US)

(73) Assignee: PEGASUS SOLAR, INC., Richmond, CA (US)

( * ) Notice: Subject to any disclaimer, the term of this patent is extended or adjusted under 35 U.S.C. 154(b) by 0 days.

(21) Appl. No.: 16/889,618

(22) Filed: Jun. 1, 2020

(65) Prior Publication Data

US 2020/0389121 A1 Dec. 10, 2020

Related U.S. Application Data

(60) Provisional application No. 62/858,208, filed on Jun. 6, 2019.

(51) Int. Cl.
*E04D 3/24* (2006.01)
*H02S 20/23* (2014.01)
*E04D 3/40* (2006.01)
*E04D 3/36* (2006.01)

(52) U.S. Cl.
CPC .............. *E04D 3/24* (2013.01); *E04D 3/3606* (2013.01); *E04D 3/40* (2013.01); *H02S 20/23* (2014.12)

(58) Field of Classification Search
CPC . E04B 1/2604; E04B 1/58; E04B 1/26; E04B 2001/262; E04B 2001/2672; E04B 2001/5887; E04B 2001/2644; H02S 20/23; E04D 1/2914; E04D 1/265; E04D 3/24; E04D 3/30; E04D 3/40; E04D 3/3606; E04D 3/361; E04D 3/36; E04D 3/368; E04D 3/362; E04D 13/12; Y02E 10/47; Y02E 10/50
See application file for complete search history.

(56) References Cited

U.S. PATENT DOCUMENTS

| | | | | |
|---|---|---|---|---|
| 117,855 | A | * 8/1871 | Belt | ..................... E04F 13/0864 52/519 |
| 1,258,509 | A | 3/1918 | Wentworth | |
| 3,983,675 | A | 10/1976 | Pearse et al. | |
| 4,683,697 | A | 8/1987 | Gregg | |

(Continued)

FOREIGN PATENT DOCUMENTS

| | | |
|---|---|---|
| CH | 610617 A5 | 4/1979 |
| JP | 2019-27123 A | 2/2019 |

OTHER PUBLICATIONS

International Search Report and Written Opinion from the International Searching Authority, dated Aug. 18, 2020, 9 pages, for corresponding International Patent Application No. PCT/US2020/036165.

*Primary Examiner* — Jessie T Fonseca
(74) *Attorney, Agent, or Firm* — Polsinelli LLP

(57) ABSTRACT

A roof pan with raised ridges along lateral edges, where the raised ridges of one pan cooperate raised ridges of another pan to prevent water movement. A formed edge that is offset from the roof surface when the pan is installed on the roof allows a flashing to slide under the formed edge when the roof pan is installed on the roof surface.

15 Claims, 21 Drawing Sheets

(56) References Cited

U.S. PATENT DOCUMENTS

| | | | | |
|---|---|---|---|---|
| 4,878,331 A * | 11/1989 | Taylor | ............... | E04D 3/363 |
| | | | | 52/519 |
| 7,703,256 B2 * | 4/2010 | Haddock | ............... | F16B 5/0004 |
| | | | | 52/543 |
| 8,844,234 B2 * | 9/2014 | Haddock | ............... | F16B 5/0096 |
| | | | | 52/545 |
| 2011/0272545 A1 | 11/2011 | Liu | | |
| 2012/0067868 A1 * | 3/2012 | Casey | ............... | H05B 3/565 |
| | | | | 219/546 |
| 2013/0160382 A1 * | 6/2013 | Schick | ............... | F24S 25/40 |
| | | | | 52/173.3 |
| 2013/0168525 A1 * | 7/2013 | Haddock | ............... | E04D 3/361 |
| | | | | 248/505 |
| 2013/0186028 A1 * | 7/2013 | Resso | ............... | F24S 25/63 |
| | | | | 52/520 |
| 2014/0102556 A1 * | 4/2014 | Malpas | ............... | H02S 20/26 |
| | | | | 137/360 |
| 2015/0200620 A1 * | 7/2015 | Haddock | ............... | F24S 25/636 |
| | | | | 136/251 |
| 2016/0111998 A1 * | 4/2016 | Schmid | ............... | F16M 13/02 |
| | | | | 52/173.3 |
| 2016/0130815 A1 * | 5/2016 | Menegoli | ............... | E04D 3/363 |
| | | | | 52/588.1 |
| 2017/0033730 A1 * | 2/2017 | Almy | ............... | H02S 20/30 |
| 2017/0107723 A1 * | 4/2017 | Stearns | ............... | F24S 25/60 |
| 2017/0159295 A1 * | 6/2017 | Warner | ............... | B32B 25/16 |
| 2018/0031279 A1 * | 2/2018 | Haddock | ............... | F24S 25/615 |
| 2018/0119423 A1 * | 5/2018 | Haddock | ............... | E04D 3/362 |
| 2018/0152135 A1 * | 5/2018 | Vignal | ............... | H02S 40/36 |
| 2018/0159462 A1 * | 6/2018 | Vignal | ............... | H02S 20/23 |
| 2018/0347196 A1 * | 12/2018 | Stearns | ............... | E04D 13/00 |
| 2019/0103831 A1 * | 4/2019 | Yoon | ............... | E04D 1/34 |
| 2020/0191180 A1 * | 6/2020 | Haddock | ............... | H02S 20/23 |

\* cited by examiner

ROOF ATTACHMENT PAN FOR SOLAR ENERGY PANELS

CROSS-REFERENCE TO RELATED APPLICATION

This application claims the benefit of U.S. Provisional Application No. 62/858,208 entitled "ROOF ATTACHMENT PAN FOR SOLAR ENERGY PANELS," filed on Jun. 6, 2019, the full disclosure of which is incorporated herein in its entirety.

BACKGROUND

Current solar mounting solutions for new sloped roofs are time consuming to install and therefore insufficient to meet the growing demand. A simpler more streamlined solution is necessary to reduce the cost and amount of skilled labor necessary for a solar installation.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1A:
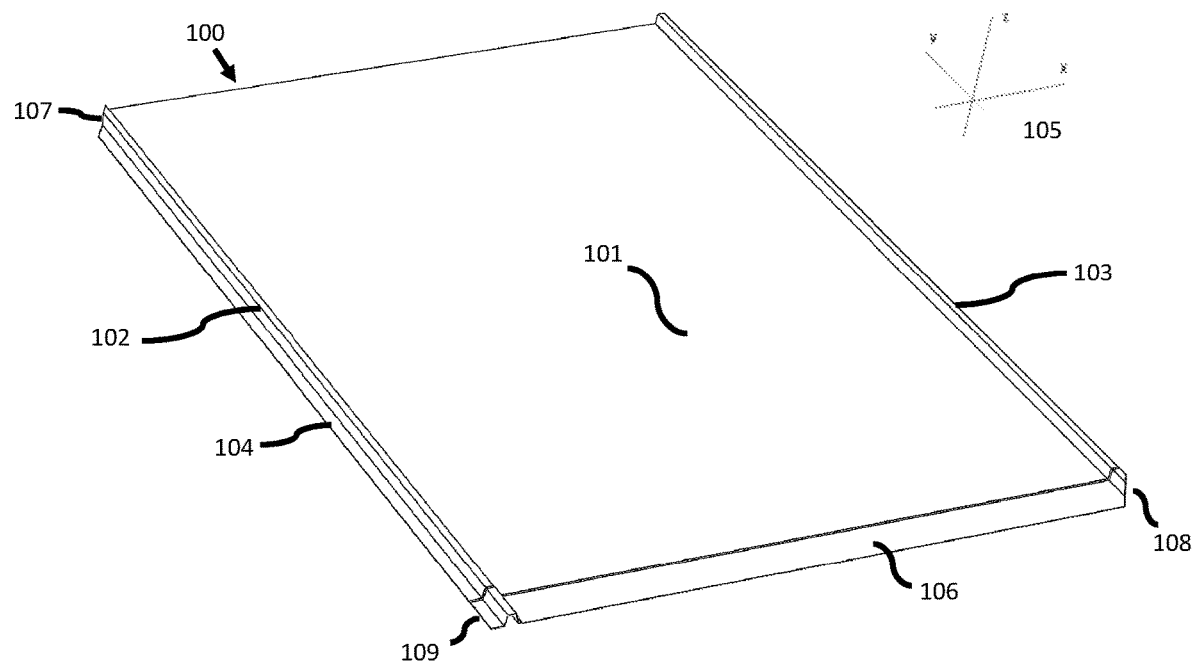
FIG. 1A depicts a solar panel roof pan, as seen from an isometric view.

FIG. 1A depicts roof pan 100 in an isometric view. The roof pan 100 has a main surface 101 that installs onto a rooftop surface. In the FIG. 1A, the roof pan 100 is oriented with XYZ coordinate planes 105. The roof pan 100 has one or more left side ridge(s) 102 and one or more right side ridge(s) 103 on the edges of the roof pan 100 that may be formed along the whole length of the roof pan 100 along the Y axis. The left side ridges 102 and right side ridges 103 may be tapered toward the positive Z direction in order to allow two or more roof pans 100 to stack for shipping with minimal spacing between stacked roof pans. The tapered shape may also allow for easier manufacturability of the roof pan 100. The roof pan 100 may have a horizontal flange 104 extending in the negative X direction from the left side ridge 102 and a second horizontal flange 104 extending from the right side ridge 103 (not shown). These two horizontal flanges may extend in opposite directions for a different length. The roof pan 100 may also have a formed edge 106 on the lower side. The formed edge 106 may be the entire width of roof pan 100 or may only be the width of main surface 101 or may be only the widths of left side ridges 102 and right side ridges 103. The formed edge 106 may extend in the positive Z direction, away from the roof surface. The interface between the formed edge 106 and rest of the roof pan 100 may be at a sloped angle to allow water runoff. For example, the sloped angle may be less than a typical roof surface angle relative to the horizon in order to allow water and debris runoff. The formed edge 106 may be formed in the positive Z direction substantially the same distance as the thickness of the material of roof pan 100. This allows the top edge of a second roof pan 100 to fit under the formed edge 106 of a first roof pan 100, wherein both roof pans 100 are coincident with the roof surface, and the gap between the top edge of a second roof pan 100 and the formed edge 106 of a first roof pan 100 is minimized. The formed edge 106 may extend in the negative Y direction a distance required to substantially prevent water from reaching the roof surface from wind or a capillary effect. Roof pan 100 may have a diagonally chamfered top corner 107 and a diagonally chamfered bottom corner 108. The chamfered edge of both top corner 107 and bottom corner 108 may be substantially parallel and may extend along the X and Y axis a substantially similar distance in inverse directions. Roof pan 100 may be manufactured using a plastic, aluminum, steel, tin, or similar material. The roof pan 100 may have a corrosion resistant coating, including a paint to modify its color and appearance.

Figure 1B:
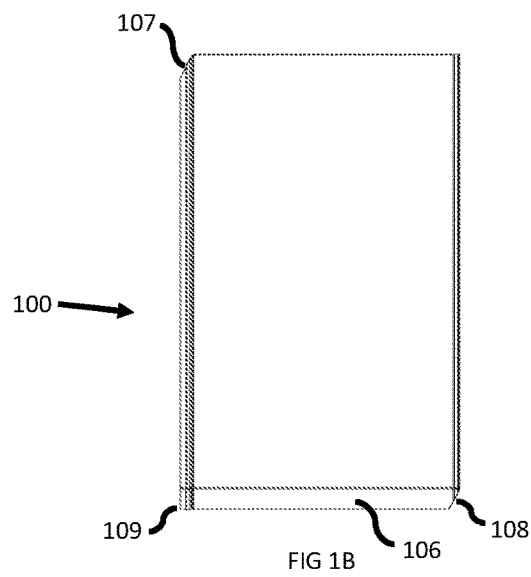
FIG. 1B depicts a top view of a solar panel roof pan.

FIG. 1B shows a top view of roof pan 100 and chamfered top corner 107 and chamfered bottom corner 108. In the example embodiment of the present invention, the formed edge 106 extends the entire width of roof pan 100.

Figure 1C:
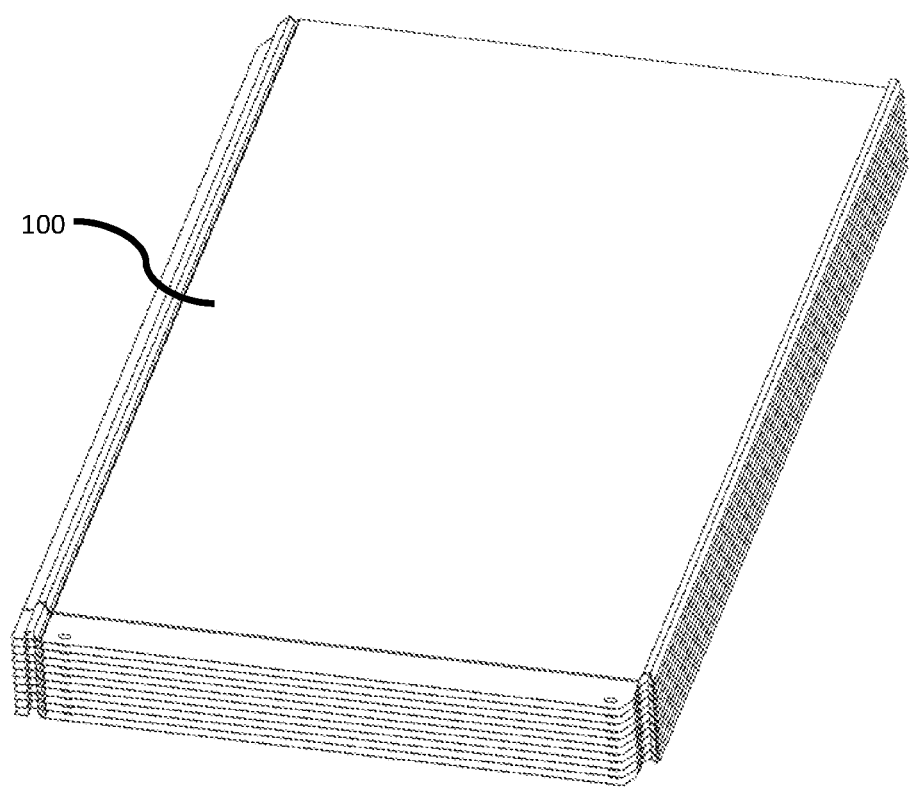
FIG. 1C shows multiple roof pans stacked together (extra space shown for better visual representation)

FIG. 1C shows multiple roof pans 100 stacked with the side ridges nested in the corresponding side ridges of roof pans above and below. The side ridges help to stabilize multiple roof pans for shipping and handling. The side ridges may be tapered such that the roof pans are fully coincident with one another. This feature would improve the packaging density of multiple roof pans. In another example of the present invention, the side ridges may be tapered to interfere with one another in order to leave a small gap between adjacent roof pans. This may be useful to allow easier handling and un-stacking of one or more roof pans.

Figure 1D:
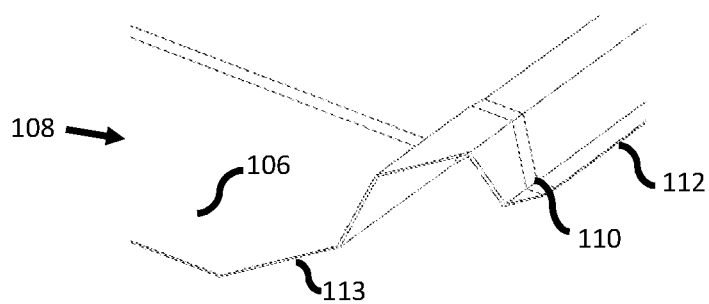
FIG. 1D depicts a close-up view of the bottom right corner of a roof pan.

FIG. 1D depicts a close-up view of chamfered right bottom corner 108 of roof pan 100. Edge 113 may be substantially linear and may cut across formed edge 106 from the upper portion of jog 110. In other example embodiments of the present invention, edge 113 may intersect the far-right edge of the roof pan 100 in the positive or negative Y direction relative to jog 110.

Figure 1E:
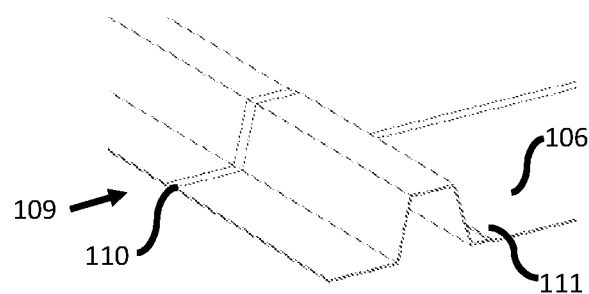
FIG. 1E depicts a close-up view of the bottom left corner of a roof pan.

FIG. 1E depicts a close-up view of the bottom left corner 109 of roof pan 100. In this example embodiment of the present invention, formed edge 106 includes all surfaces on the lower edge of roof pan 100, including the main surface 101, the left side ridge 102, and the horizontal flange 104. Jog 110 provides a sloped transition in the material from the main body of the roof pan 100 to the formed edge 106. The jog 110 may have a consistent cross section across entire formed edge 106, including the side ridges and horizontal flanges, or it may have a variable cross section. Jog 110 may be at an angle relative to the main surface 101 and the formed edge 106 that is less than a typical roof surface angle relative to the horizon such that when installed on a typical roof surface, the material of jog 110 is at an angle between horizontal and the angle of the roof surface. Formed edge 106 may be substantially parallel to the main surface 101. Left ridge jog 111 extends in the positive Z direction away from the formed edge 106, with the top surface being substantially parallel with the formed edge 106. Left ridge jog 111 has a length in the X direction equal to or greater than the length in the X direction of the right horizontal flange 112. This allows a right horizontal flange 112 of a first roof pan 100 to nest under left ridge jog 111 of a second roof pan 100.

Figure 2A:
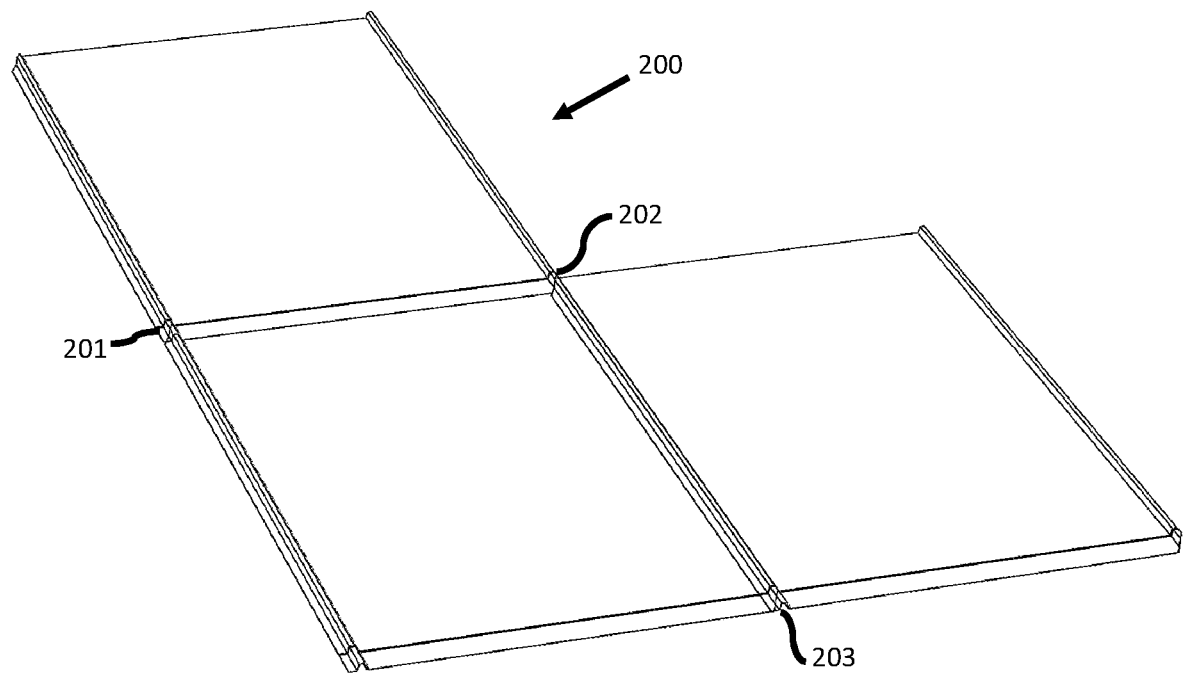
FIG. 2A depicts multiple roof pans configured together.

FIG. 2A is an example embodiment of the present invention depicting multiple roof pans 100 configured together along the Y axis and X axis of a roof surface into a roof pan array 200. In other examples of the present invention, multiple roof pans may connect along the X axis, or a pan may be removed in a row and the row would continue. Multiple roof pans may be configured in a rectangular array shape, an "L" array shape, or other configurations. A first and a second roof pan may overlap along the Y axis at connection 201. Three or more roof pans overlap at corner 202. A first and a second roof pan may overlap along the Y axis at connection 203.

Figure 2B:
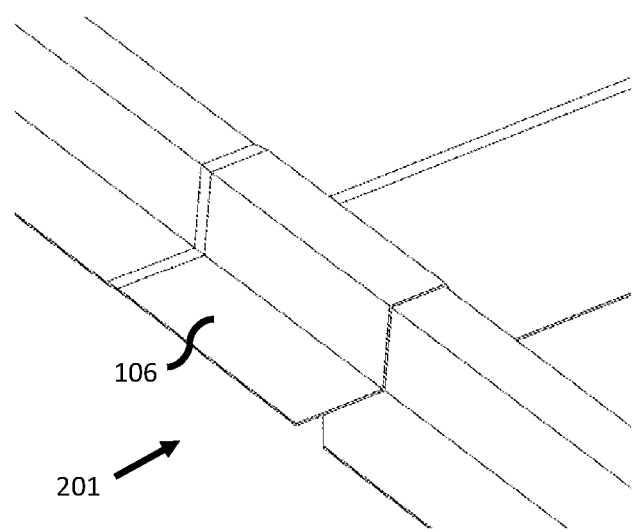
FIG. 2B depicts a close-up view of a connection between roof pans.

FIG. 2B depicts a close-up view of the connection 201 along the Y axis between a first and a second roof pan. Formed edge 106 of the upper roof pan 100 overlaps the upper edge of the lower roof pan 100.

Figure 2C:
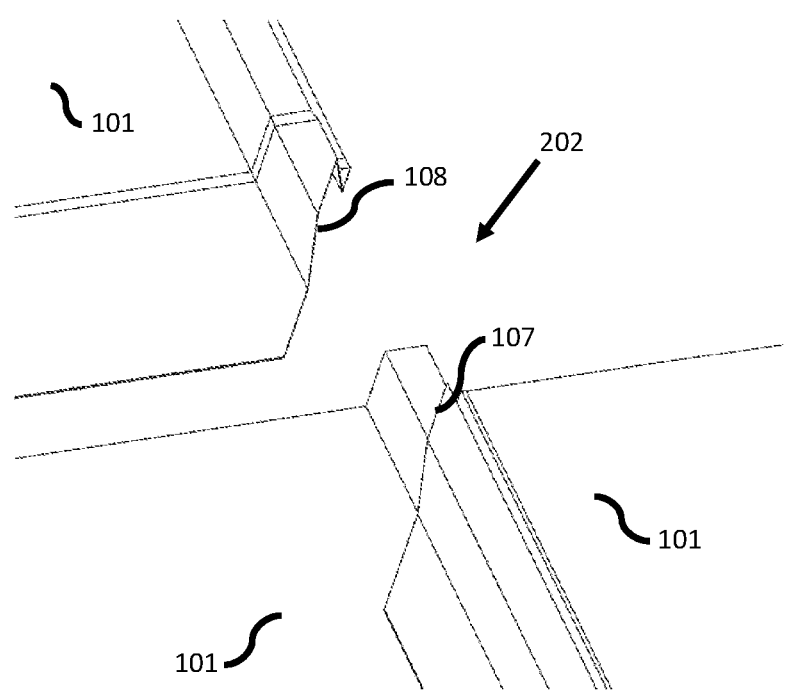
FIG. 2C depicts a close-up view of a corner of 3 roof pans.

FIG. 2C depicts a close-up view of corner 202 when two roof pans 100 adjacent in a single row are connected and a third roof pan in a row above is aligned prior to installation. A chamfered bottom corner 108 overlaps the seam of two connected panels having main surfaces 101.

Figure 2D:
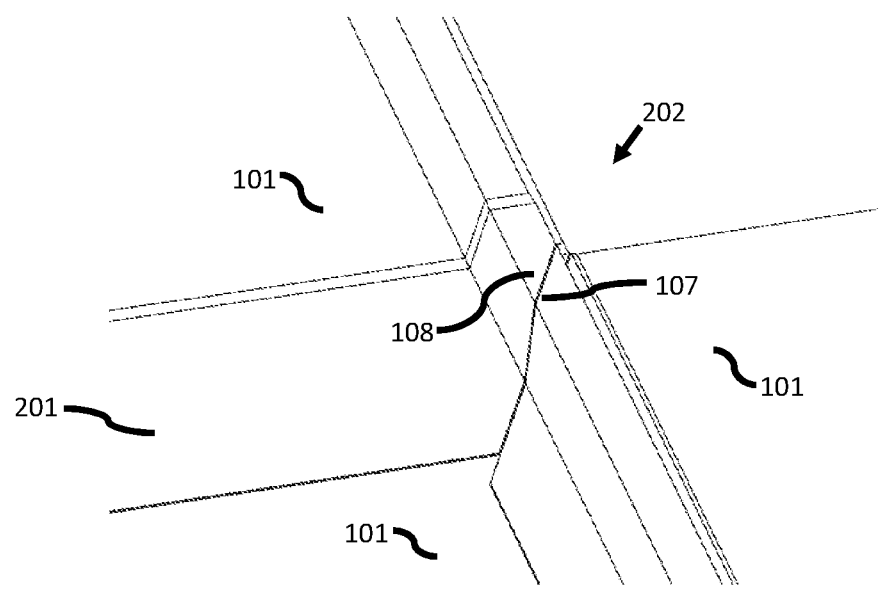
FIG. 2D depicts a corner of 3 roof pans once connected.

FIG. 2D depicts an example of an optional next step of the present invention from FIG. 2C after the upper pan is installed. The chamfered bottom corner 108 of roof pan 100 rests against the chamfered top corner 107 of another roof pan 100. Corners 107 and 108 do not overlap or interfere with each other. Both corners are parallel to each other such that they create a substantially flush surface when brought together.

Figure 2E:
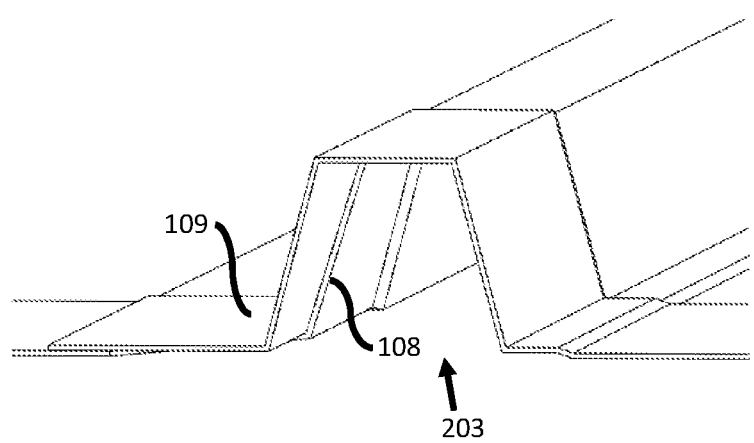
FIG. 2E depicts a close-up view of two roof pans overlapping.

FIG. 2E depicts a close-up view of connection 203 in which two roof pans overlap along the Y axis to connect two roof pans 100 on the X axis. The bottom left corner 109 overlaps the chamfered right bottom corner 108 of an adjacent roof pan 100. When overlapped, the non-chamfered left bottom corner 109 creates a flush edge with respect to the X axis to the adjacent second roof pan. The jog 110 may act as an edge which stops the right most roof pan from moving in the negative Y direction.

Figure 3A:
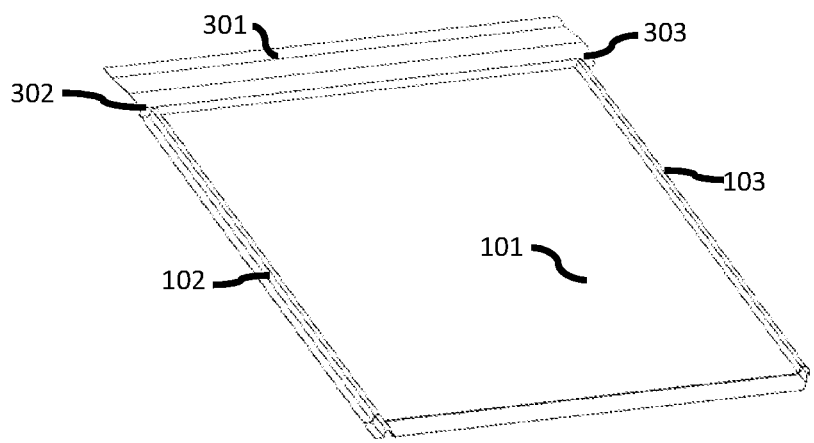
FIG. 3A depicts a ridge flashing overlapping a roof pan.

FIG. 3A is an example of an embodiment of the present invention depicting a ridge flashing 301 overlapping main surface 101 and both side ridges 102 and 103. The ridge flashing 301 may have a left-side aperture 302 and a right-side aperture 303 which allow for left side ridges 102 and right side ridges 103 to intersect through. The left-side aperture 302 and right-side aperture 303 may have a similar shape as the outer edge of left side ridges 102 and right side ridges 103, respectively, to minimize any gap between the ridge flashing 301 and roof pan 100.

Figure 3B:
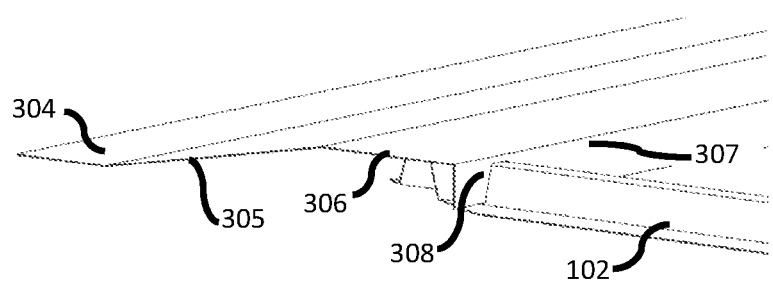
FIG. 3B shows a close-up view of a ridge flashing overlapping the ridge of a roof pan.

FIG. 3B depicts a close-up view of ridge flashing 301 overlapping left side ridge 102 of roof pan 100. Ridge flashing 301 may consist of a flat leading surface 304 which lays parallel with the roof surface and of the main surface

101. An angled surface 305 at some angle Θ to flat leading surface 304 may increase the height of ridge flashing 301 in the Z axis such that a flat surface 306 can fit over the left side ridge 102. Another angled surface 307 extends downward in the negative Z direction such that it substantially encloses the gap between the main surface 101 and flat surface 306. Angled surface 307 has an aperture 308 which allows it to substantially fill the space between flat surface 306 and roof pan main surface 101 without interfering with left side ridge 102. The shape of aperture 308 may have a similar shape to the cross-sectional shape of left side ridge 102 in order to minimize the space between ridge flashing 301 and left side ridge 102. The aperture 308 may also be any other shape to ensure the angled surface 307 does not interfere with left side ridge 102.

Figure 4A:
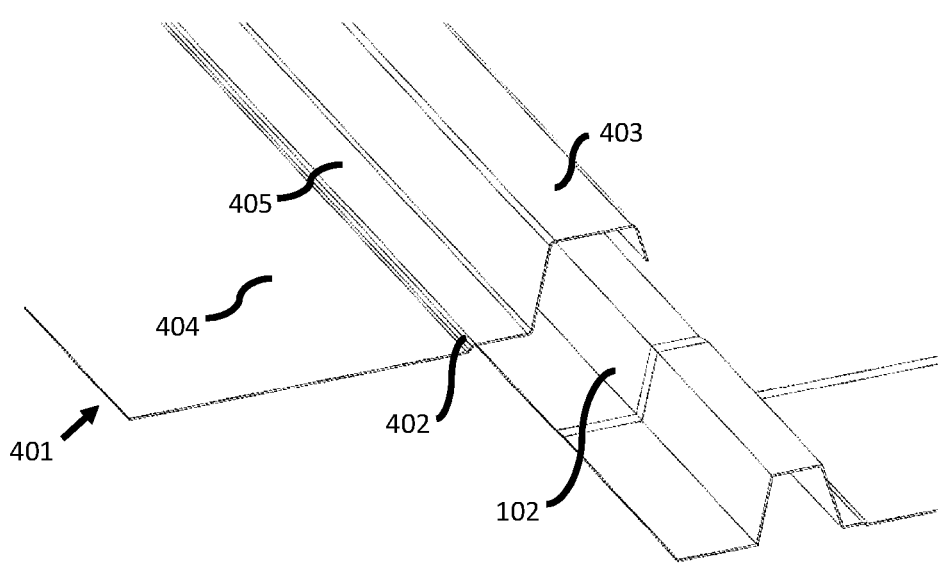
FIG. 4A depicts a side flashing which may overlap the left or ride side of a roof pan.

FIG. 4A is an example of an embodiment of the present invention depicting a side flashing 401 which may overlap either the left side ridge 102 or right side ridge 103 (not shown) of roof pan 100. Side flashing 401 may consist of a flat surface 404 which resides on the same plane as roof pan main surface 101. Side flashing 401 may have a jog 402 which raises the height of side flashing 401 in the positive Z direction such that flat surface 404 may rest on the roof plane while flat surface 405 may above or coincident with the top surface of roof pan 100. Side flashing 401 may have a raised section 403 which overlaps left side ridge 102. The raised section 403 may overlap left side ridge 102 on the left and top side, or it may additionally overlap left side ridge 102 on the left, top, and right side such that it may be lifted into the Z axis in order to be removed. The same side flashing 401 may be turned 180-degrees about the Z axis and used in a similar fashion on right side ridge 103 (not shown). In this example, the same features would apply.

Figure 4B:
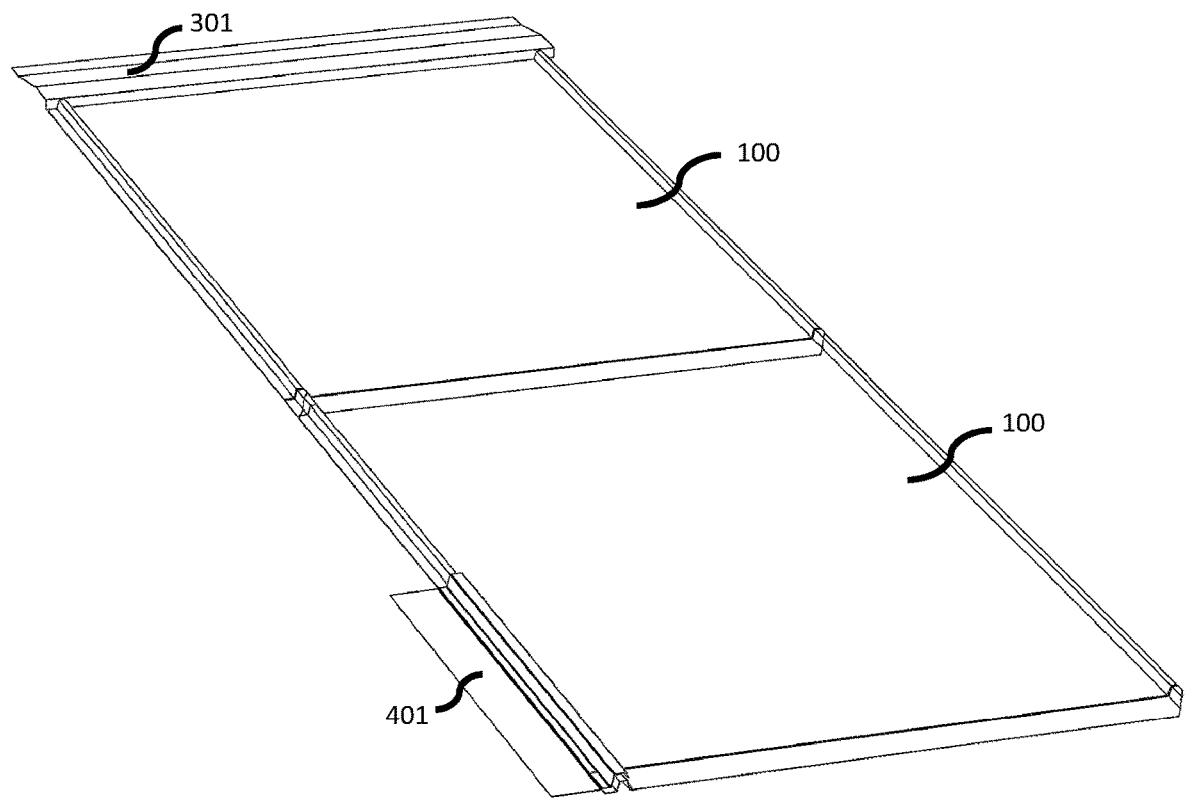
FIG. 4B shows a side flashing installed on the left side of a roof pan.

FIG. 4B depicts a side flashing 401 installed over roof pan 100. Side flashing 401 may span the entire length along the Y axis of roof pan 100, or side flashing 401 may extend only up a portion of the length along the Y axis of roof pan 100, as shown in the Figure.

Figure 4C:
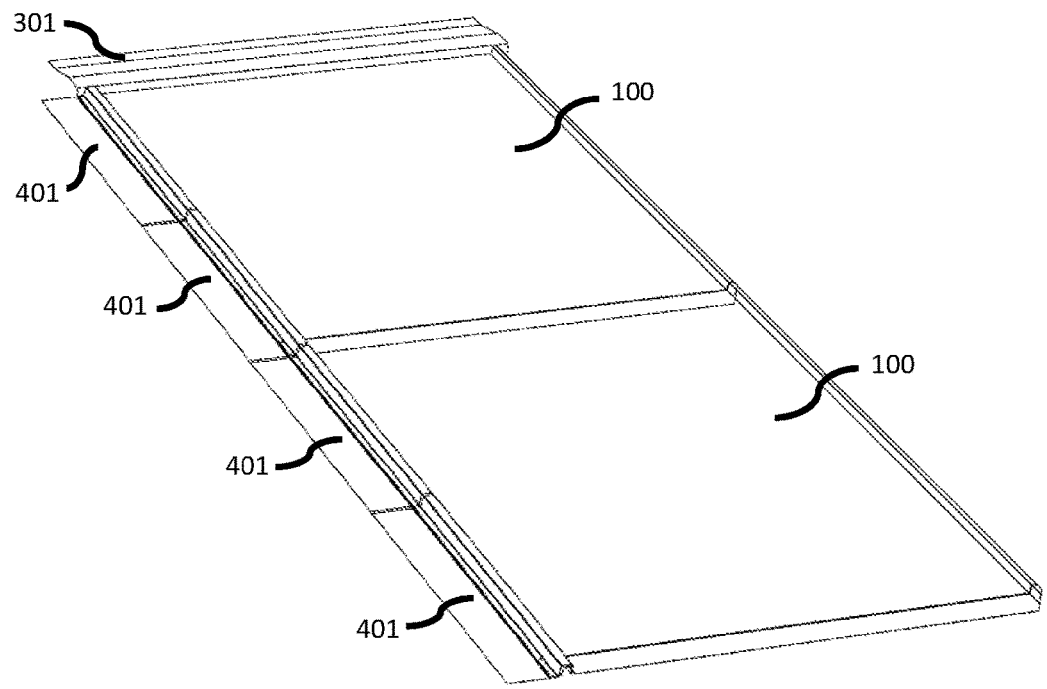
FIG. 4C shows multiple side flashings overlapping a side of multiple roof pans.

FIG. 4C is an example of an embodiment of the present invention depicting multiple side flashings 401 overlapping with the left side ridge 102 of one or more roof pans 100. Side flashings 401 may nest on one another, such that multiple side flashings may be layered along the Y axis in order to cover the length of one or more roof pans along the Y axis. The top edge of side flashing 401 may be placed coincident with angled surface 307 of the ridge flashing 301 or may fit under ridge flashing 301 through left-side aperture 302.

Figure 4D:
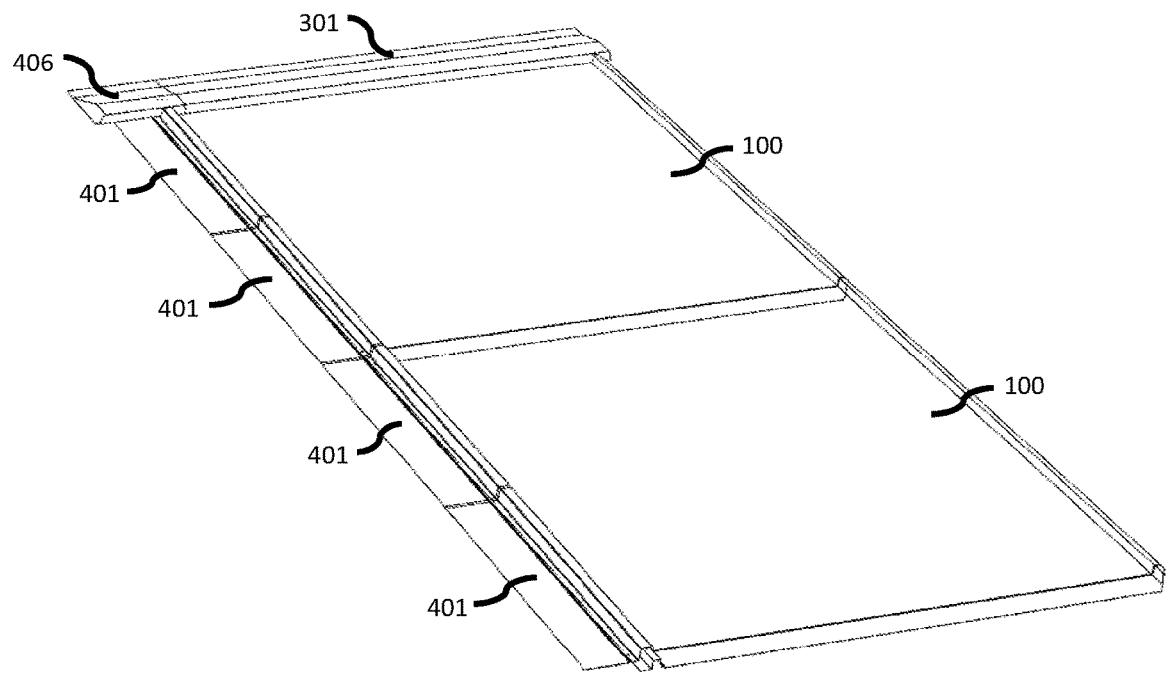
FIG. 4D depicts a corner flashing overlapping adjacent ridge flashings.

FIG. 4D is an example of an embodiment of the present invention depicting a corner flashing 406 which overlaps the connection between the ridge flashing 301, the roof pan 100, and the side flashing 401. Corner flashing 406 may have a similar same cross-sectional shape as the ridge flashing 301 and may have an additional angled face which slopes down to the roof surface, as shown in the Figure.

Figure 5A:
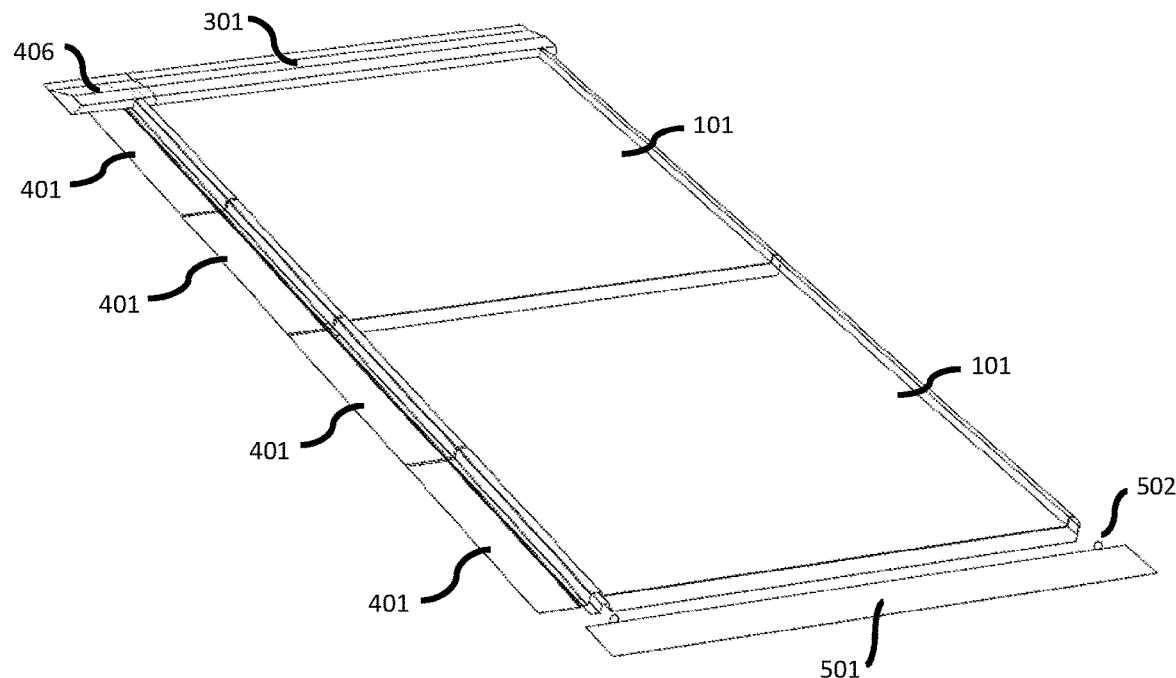
FIG. 5A depicts an eave flashing at the bottom of a roof pan.

FIG. 5A is an example of an embodiment of the present invention depicting an eave flashing 501 which fits under the formed edge 106 of the roof pan 100. The eave flashing 501 may have one or multiple tabs 502 which protrude upward in the Z direction. The tabs 502 may have a shape that partially or substantially fills the cavity created on the underside of the left side ridge 102 and right side ridge 103.

Figure 5B:
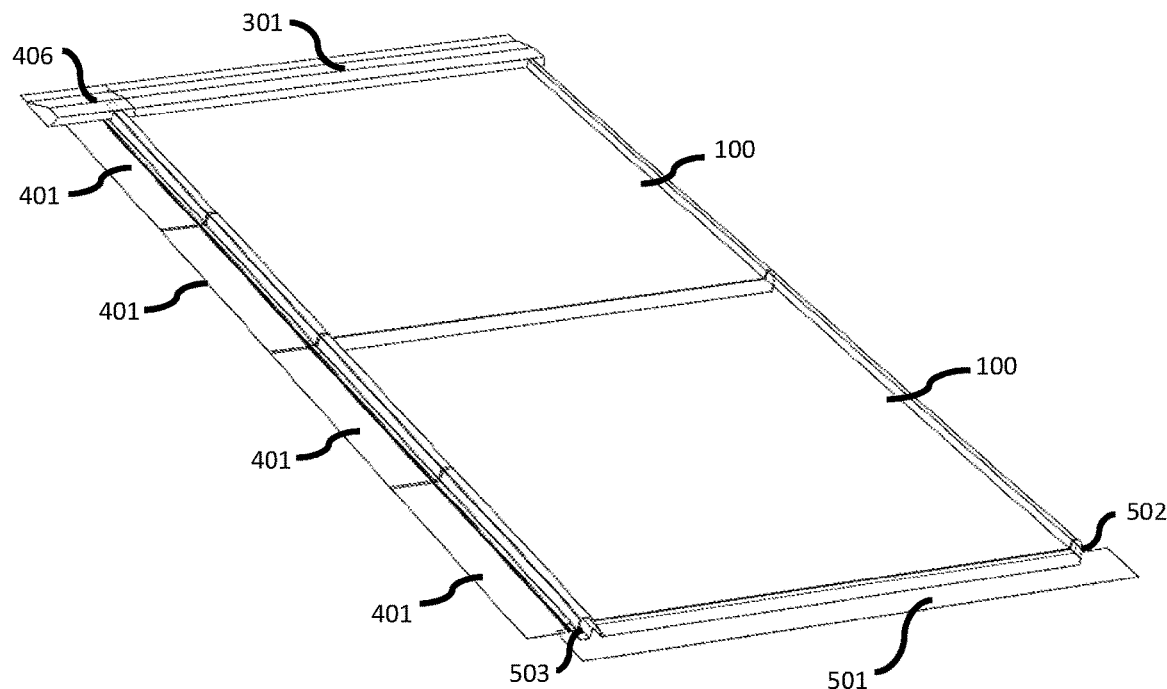
FIG. 5B depicts an eave flashing installed underneath the bottom edge of a roof pan.

FIG. 5B depicts an example next installation step of the present invention from FIG. 5A in which the eave flashing 501 is placed underneath the formed edge 106. The vertical tabs 502 fit within the cavity made by the left side ridge 102 and right side ridge 103, thus creating the obstruction 503.

Figure 5C:
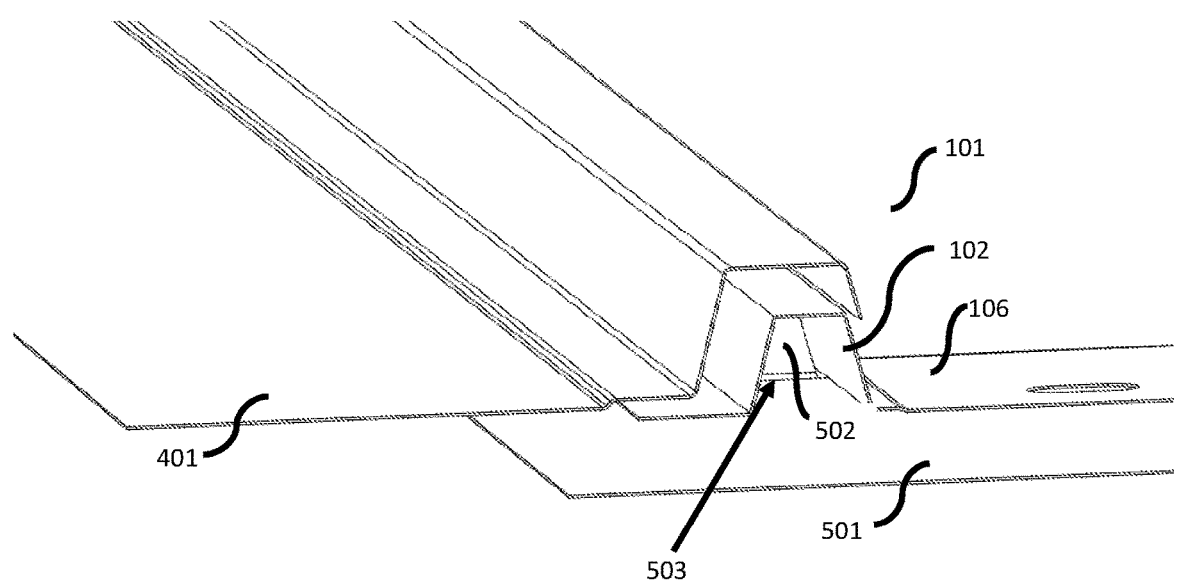
FIG. 5C is a close-up view of an eave flashing underneath a roof pan.

FIG. 5C is a close-up view of obstruction 503 in which the eave flashing 501 fits underneath the formed edge 106 of roof pan 100 and may fit underneath the side flashing 401. The vertical tab 502 fits within the cavity made by left side ridge 102. The shape of vertical tab 502 may have a similar cross-sectional shape of left side ridge 102 such that vertical tab 502 substantially fills the cavity under left side ridge 102.

Figure 5D:
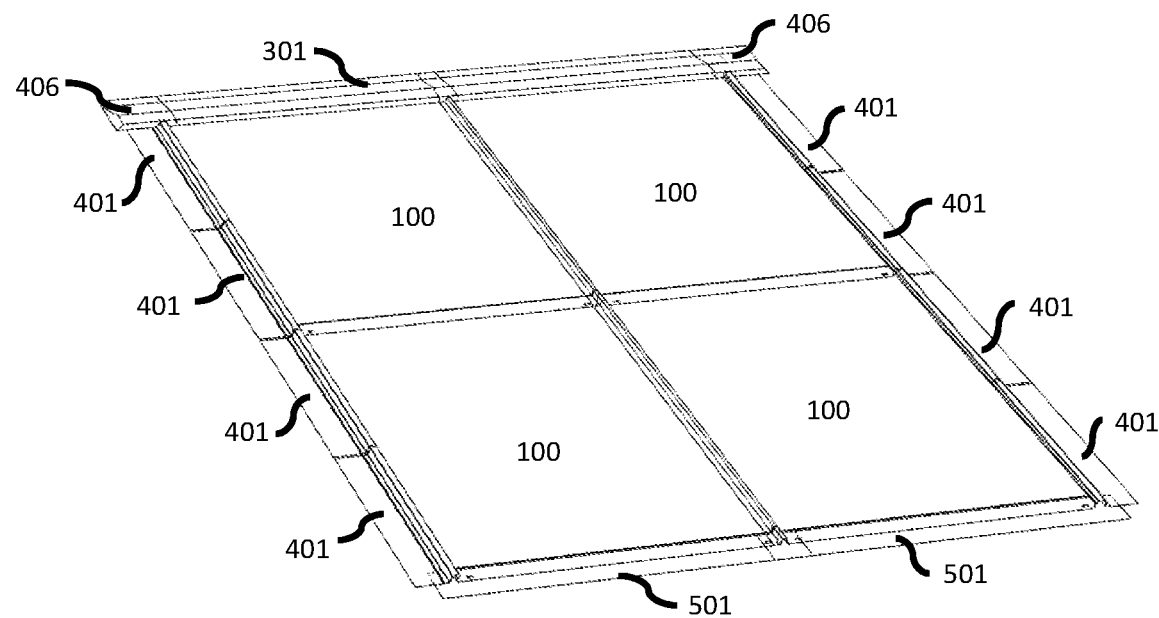
FIG. 5D depicts a possible full assembly of multiple roof pans, ridge flashings, corner flashings, side flashings, and eave flashings.

FIG. 5D depicts a possible next step from FIG. 5B in which multiple roof pans 100, ridge flashings 301, corner flashings 406, side flashings 401, and eave flashings 501 create a completed roof pan system. Ridge flashings 301 overlap each other along the X axis in order to sufficiently cover the top edge of multiple roof pans 100. One or more corner flashings 406 may be used at each top right and top left corner. One or more side flashings 401 may be placed on the left or right edge of multiple roof pans 100 to sufficiently cover the entire left or right edge with respect to the Y axis. One or more eave flashings 501 may be used at the bottom edge of multiple roof pans 100 to sufficiently cover the entire bottom edge of roof pans 100 along the X axis.

Figure 6A:
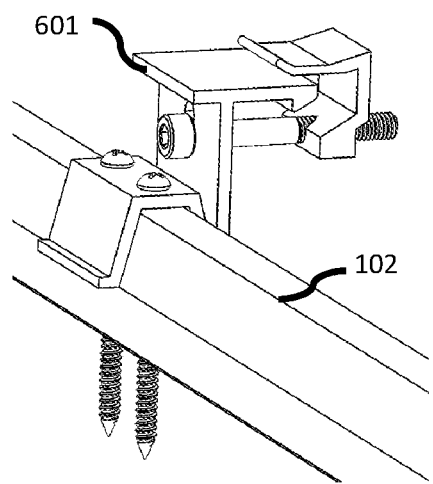
FIG. 6A depicts an attachment bracket secured to a roof pan.

FIG. 6A in an example embodiment of the present invention depicting an attachment bracket 601 secured to left side ridge 102.

Figure 6B:
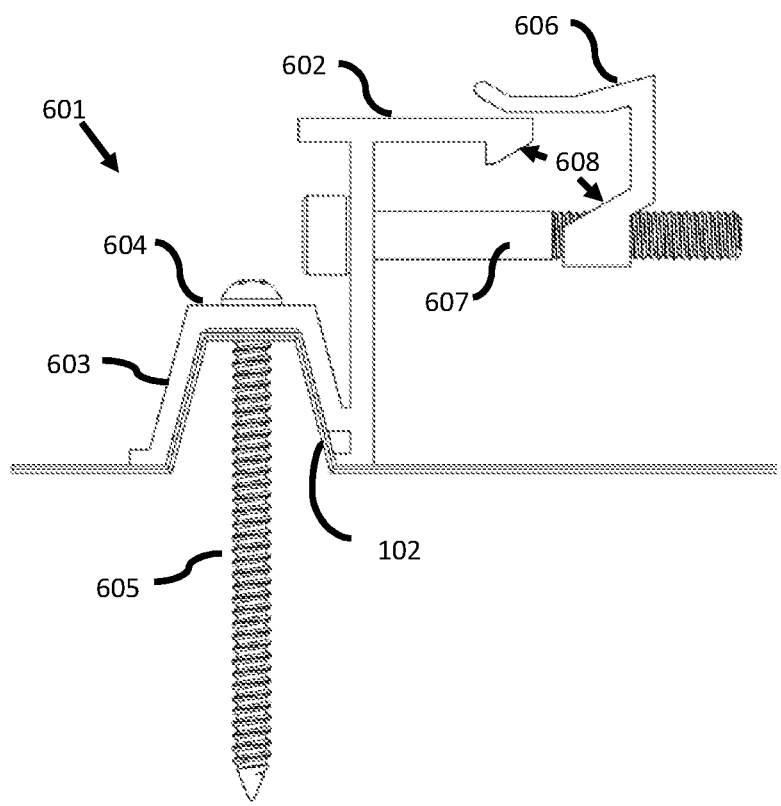
FIG. 6B is a close-up view of a possible attachment bracket.

FIG. 6B is a close-up end-view of attachment bracket 601 attached to left side ridge 102. Attachment bracket 601 may have a base 603 which fits over left side ridge(s) 102 and right side ridge(s) 103. Base 603 may have a flat surface 604 which receives one or multiple threaded fasteners 605. Fasteners 605 may pass through flat surface 604 and the left side ridge 102, and then into the roof surface, thus securing the attachment bracket 601 to the roof surface. Top flange 602, parallel to flat surface 604, may extend above flat surface 604. Top flange 602 may receive a slider 606 which traverses over top flange 602 in the X direction with the use of a fastener 607. Slider 606 may be threadably engaged with fastener 607 to traverse along the X direction when the fastener 607 is rotated. Slider 606 may interfere with top flange 602 at angled surfaces 608 to direct slider 606 down in the negative Z direction as slide 606 is advanced towards the top flange 602.

Figure 7A:
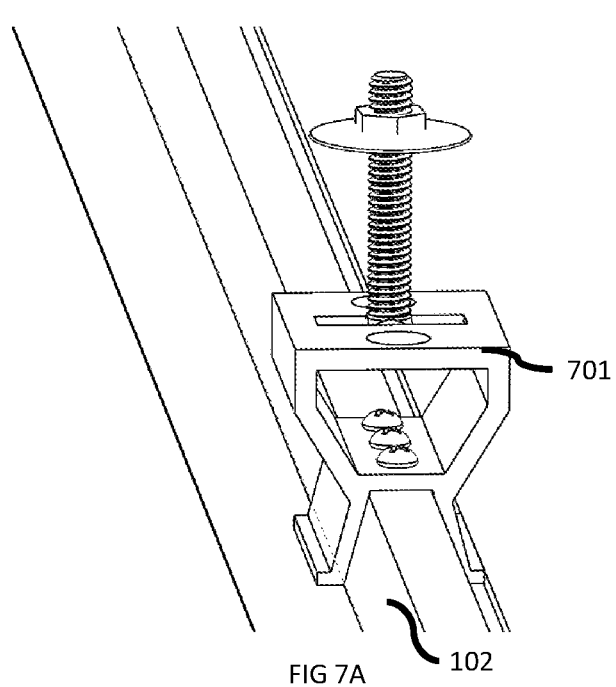
FIG. 7A depicts a possible alternative design for an attachment bracket.

FIG. 7A is an example of an embodiment of the present invention depicting an attachment bracket 701 secured to left side ridge 102.

Figure 7B:
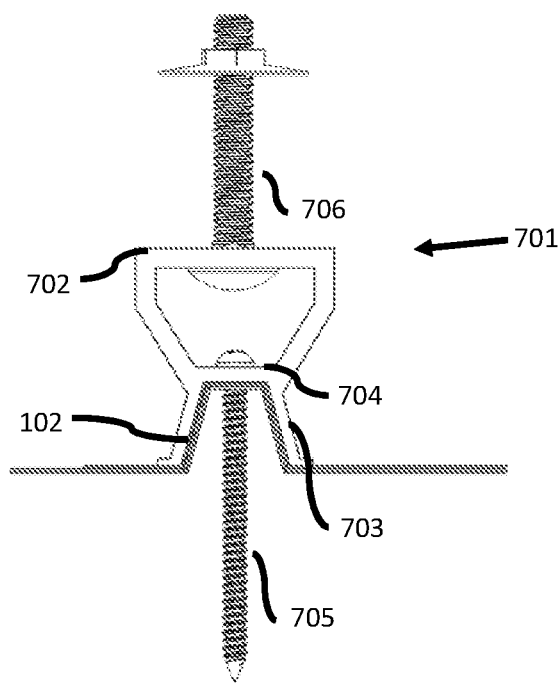
FIG. 7B is a close-up view of a possible attachment bracket.

FIG. 7B is a close-up end-view of attachment bracket 701 attached to left side ridge 102. Attachment bracket 701 may have a base 703 which fits over left side ridge 102. Base 703 may have a flat surface 704 which receives one or multiple threaded fasteners 705. Fasteners 705 may pass through flat surface 704 and the left side ridge 102, and then into the roof surface thus securing the attachment bracket 701 to the roof surface. A top surface 702, parallel to flat surface 704, may extend above flat surface 704. Top surface 702 may have a fastener 706 which protrudes through an aperture. Said aperture may be slotted to allow for fastener 706 to slide in either the X or Y direction.

Figure 7C:
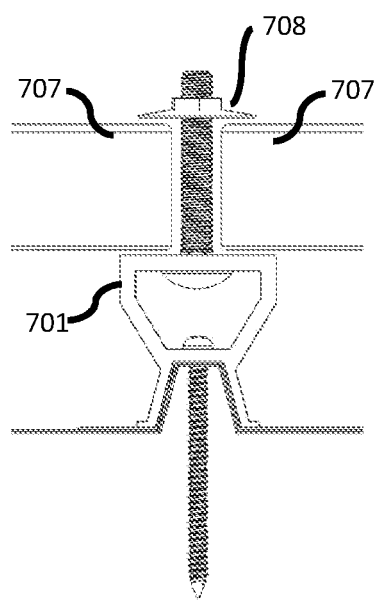
FIG. 7C depicts a solar module attached to an attachment bracket.

FIG. 7C depicts a possible next step from FIG. 7B in which one or more solar modules 707 are secured to the roof deck with the attachment bracket 701. Fastener 706 may have a coupling fastener 708 that when threadably engaged would secure one or more solar modules 707 in compression between the fastener 708 and flat surface 702. In other examples of the present invention, coupling fastener 708 may have exterior threads (i.e. a male fastener).

Figure 8A:
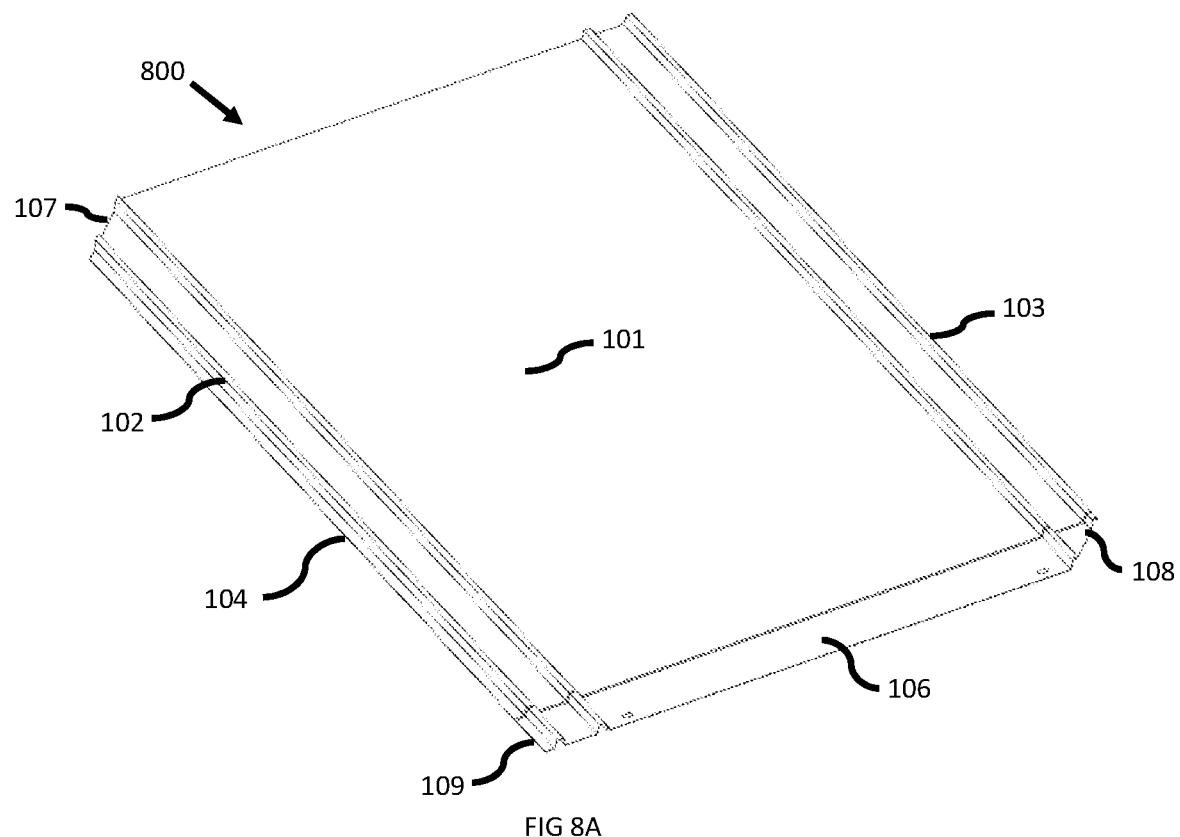
FIG. 8A depicts an alternative configuration of a solar panel Roofing Pan.

FIG. 8A depicts an alternative configuration of roof pan 100, now described as 800. The roof pan 800 has multiple left side ridges 102 and multiple right side ridges 103. Multiple ridges creates multiple places to attach attachment brackets 601 and 701 in order to provide multiple installation widths between clamps along the X axis. All other features present in roof pan 100 are also seen here in roof pan 800.

Figure 8B:
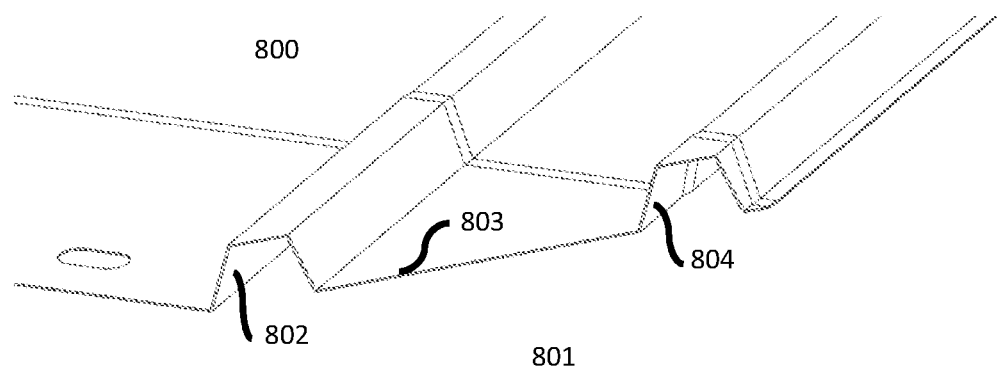
FIG. 8B depicts a close-up view of the bottom corner of an alternative configuration of a roof pan.

FIG. 8B depicts a close-up view of chamfered bottom corner 801 of roof pan 800. Edge 803 may be substantially linear and may cut across formed ridge 802 or 804 from the upper portion of jog 110. In other example embodiments of the present invention, edge 803 may intersect the far-right edge of the roof pan 800 in the positive or negative Y direction relative to jog 110.

Figure 8C:
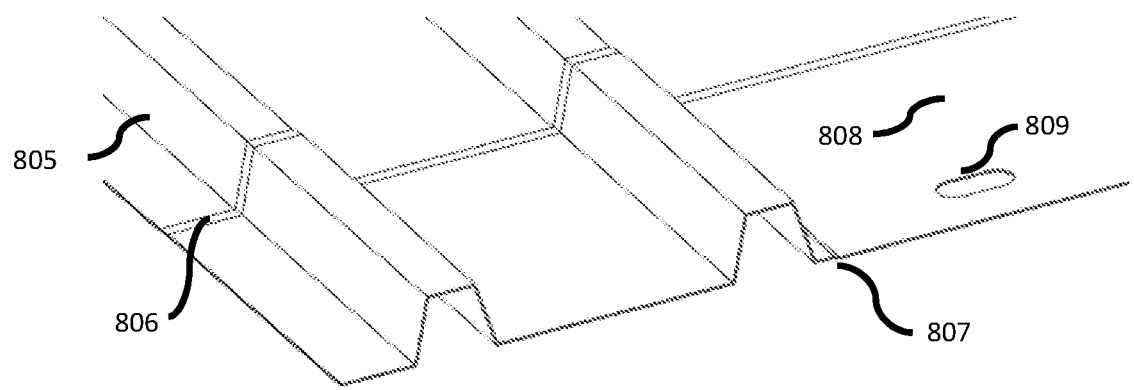
FIG. 8C depicts a close-up view of the top corner of an alternative configuration of a roof pan.

FIG. 8C depicts a close-up view of the corner 805 of roof pan 800. In this example embodiment of the present invention, formed edge 808 includes all surfaces on the lower edge of roof pan 800, including the main surface 101, the left side ridge 102, and the horizontal flange 104. Formed edge 808 may include a punched aperture 809. Jog 806 provides a sloped transition from the main body of the roof pan 800 to the formed edge 808. The jog 806 may have a consistent cross section across entire formed edge 808, including the side ridges and horizontal flanges, or it may have a variable cross section. Jog 806 may be at an angle relative to the main surface 101 and the formed edge 808 that is less than a typical roof surface angle relative to the horizon. Formed edge 808 may be substantially parallel to the main surface 101. Left ridge jog 807 extends in the positive Z direction away from the formed edge 808, with the top surface being substantially parallel with the formed edge 808. Left ridge jog 807 has a length in the X direction equal to or greater than the length in the opposite X direction of the right horizontal flange 112. This allows a right horizontal flange 112 of a first roof pan 100 to nest under left ridge jog 807 of a second roof pan 800.

Figure 9A:
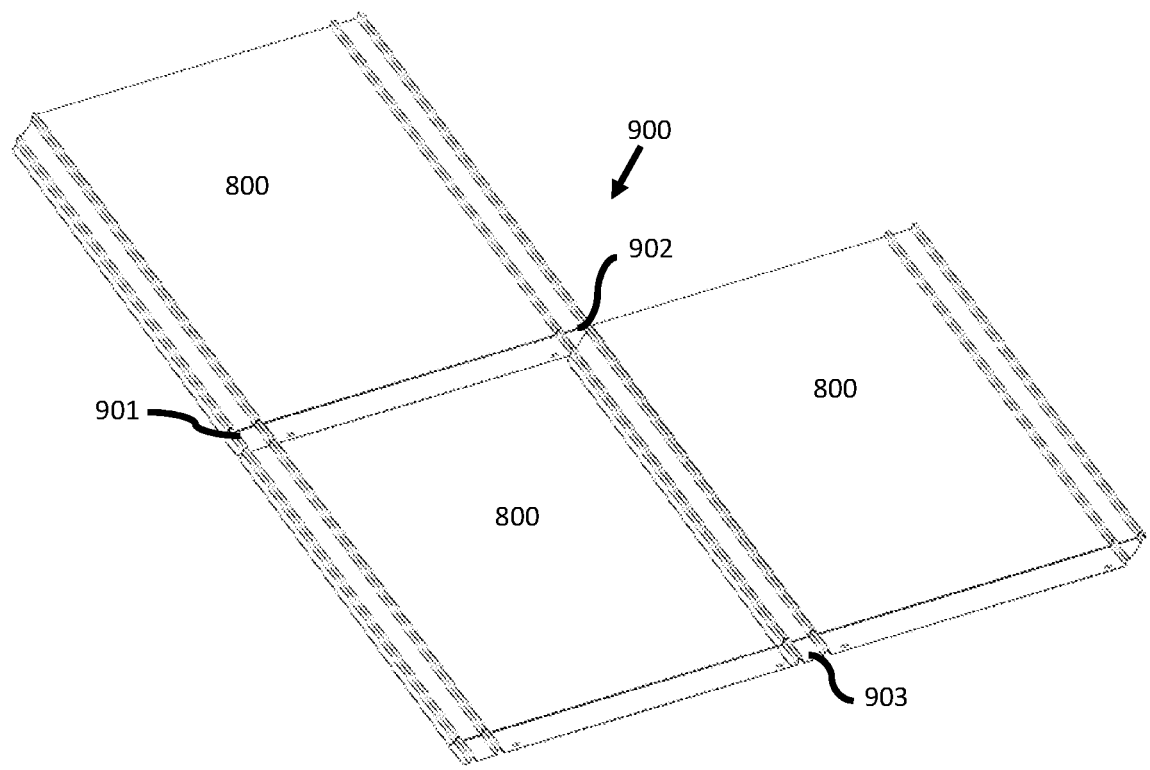
FIG. 9A depicts multiple an alternative configurations of roof pans connected together.

FIG. 9A is an example embodiment of the present invention depicting multiple roof pans 800 configured together along the Y axis and X axis of a roof surface into a roof pan array 900. In other examples of the present invention, multiple roof pans may connect along the X axis, and one or more pans may be skipped within a row. Multiple roof pans may be configured in a rectangular array shape, and "L" array shape, or other configurations. A first and a second roof pans 800 overlap along the Y axis at connection 901. Three or more roof pans 800 overlap at corner 902. A first and a second roof pan 800 overlap along the Y axis at connection 903.

Figure 9B:
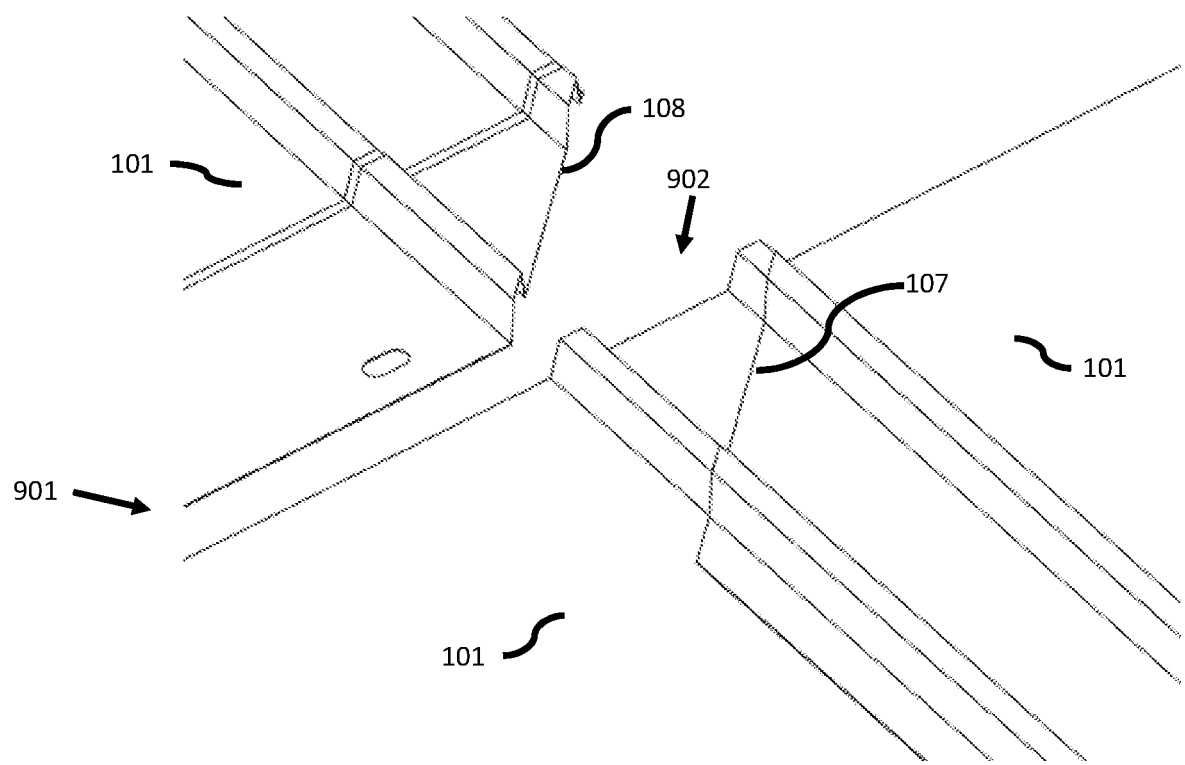
FIG. 9B depicts a close-up view of a connection between an alternative configuration of roof pans.

FIG. 9B depicts a close-up view of corner 902 when two roof pans 800 adjacent in a single row are connected and a third roof pan 800 in a row above is aligned prior to installation. A chamfered bottom corner 108 may overlap the seam of two connected panels.

Figure 9C:
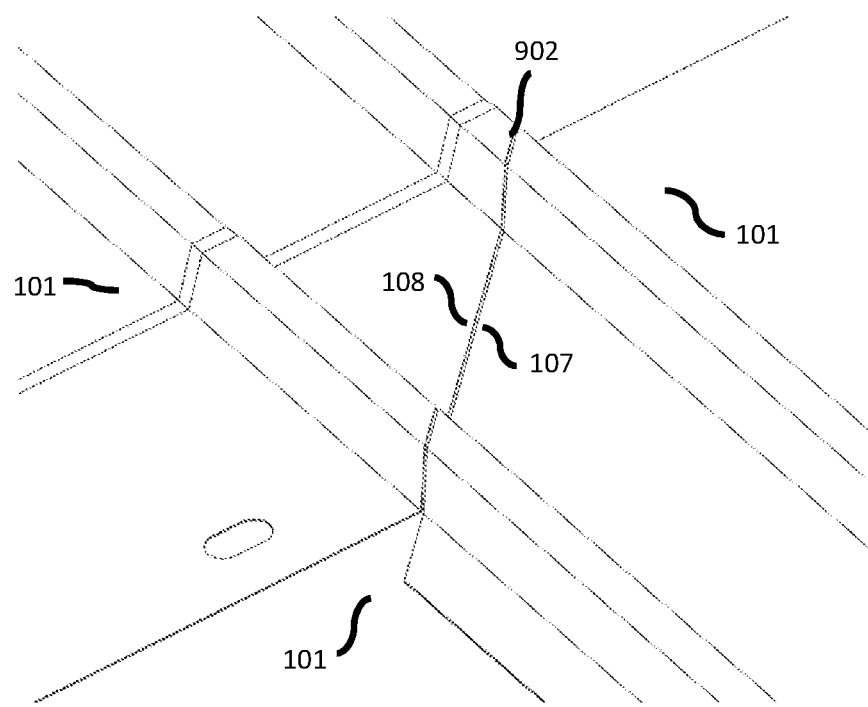
FIG. 9C depicts a corner of 3 connected roof pans.

FIG. 9C depicts an example next installation step from FIG. 9B after the third roof pan 800 is installed. The chamfered bottom corner 108 of third roof pan 800 is installed substantially close to the chamfered top corner 107 of a second roof pan 800. Corners 107 and 108 may not overlap or interfere with each other. Both may be parallel to one another such that they create a substantially flush surface when brought together.

Figure 9D:
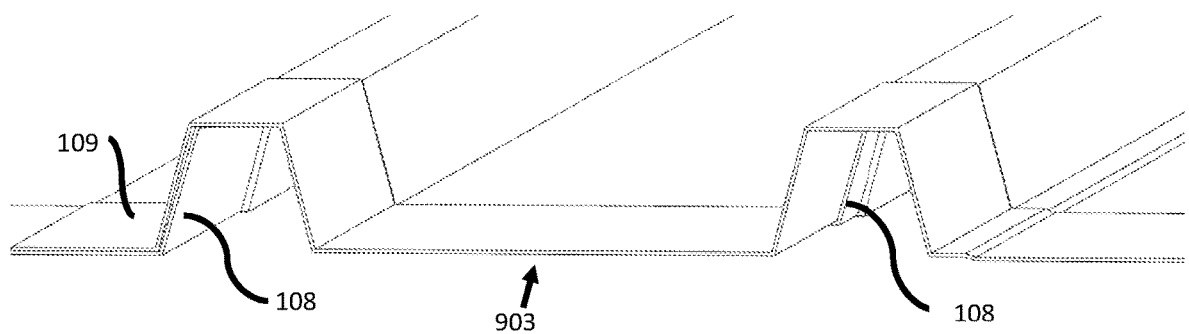
FIG. 9D depicts a close-up view of an alternative configuration of roof pans overlapping.

FIG. 9D depicts a close-up view of connection 903 in which two roof pans overlap along the Y axis. The bottom left corner 109 overlaps the chamfered right bottom corner 108 of an adjacent roof pan 800. When overlapped, the non-chamfered left bottom corner 109 creates a flush edge with respect to the X axis. The jog 806 acts as an edge which stops the right most roof pan from moving further down in the Y axis.

Figure 10A:
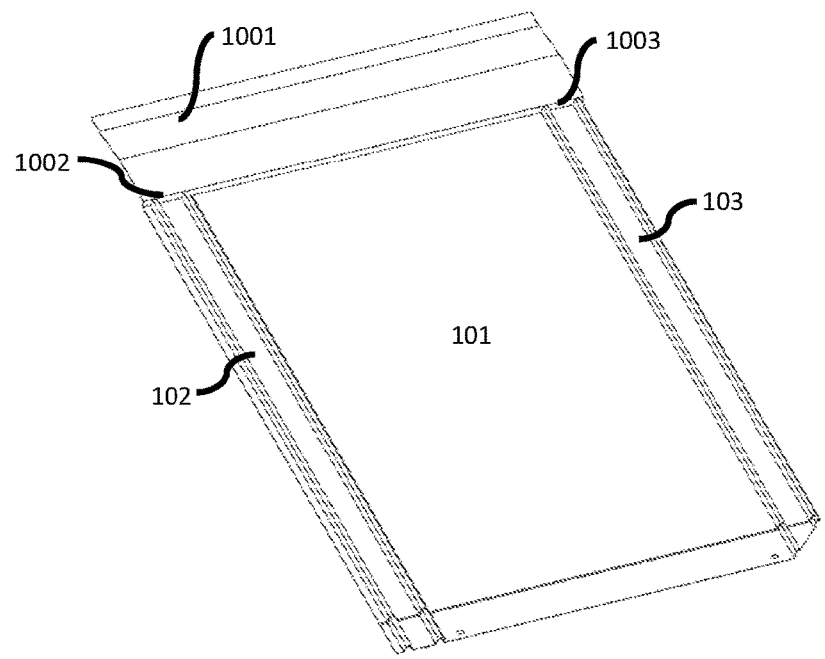
FIG. 10A depicts an alternative configuration of a ridge flashing overlapping a roof pan.

FIG. 10A is an example of an embodiment of the present invention depicting a ridge flashing 1001 overlapping main surface 101 and both side ridges 102 and 103. Ridge flashing 1001 may have one or more left-side apertures 1002 and one or more right-side aperture 1003 which allow for left side ridge 102 and right side ridge 103 to pass through.

Figure 10B:
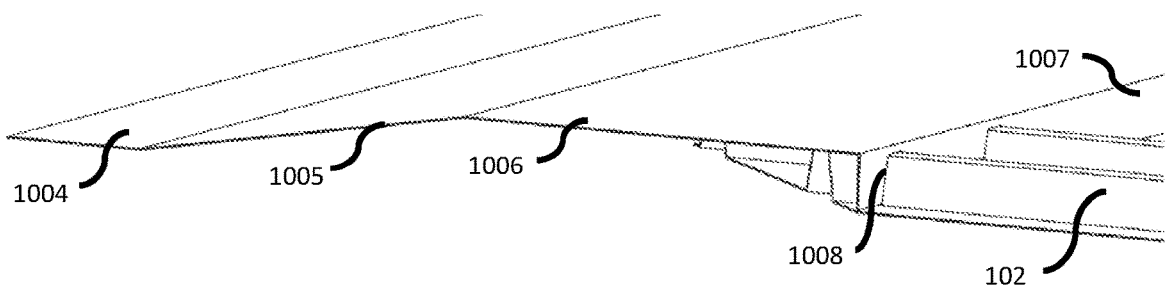
FIG. 10B depicts a close-up view of an alternative configuration of a ridge flashing overlapping a roof pan.

FIG. 10B depicts a close-up view of ridge flashing 1001 overlapping left side ridge 102 of roof pan 800. Ridge flashing 1001 may consist of a flat leading surface 1004 which lays parallel with the roof surface and of the main surface 101. An angled surface 1005 at some angle Θ with flat leading surface 1004 may increase the height of ridge flashing 1001 in the Z direction such that a flat surface 1006 can fit over the left side ridge 102. Another angled surface 1007 extends downward in the negative Z direction such that it substantially encloses the gap between the main surface 101 and flat surface 1006. Angled surface 1007 has an aperture 1008 which allows it to substantially fill the space between flat surface 306 and roof pan main surface 101 without interfering with left side ridge 102. The shape of aperture 1008 may have a similar shape to the cross-sectional shape of left side ridges 102 in order to minimize the space between ridge flashing 1001 and left side ridge 102. The aperture 1008 may also be any other shape to ensure the angled surface 1007 does not interfere with left side ridge 102. This same concept applies to all ridges of the roof pan 800.

Figure 11A:
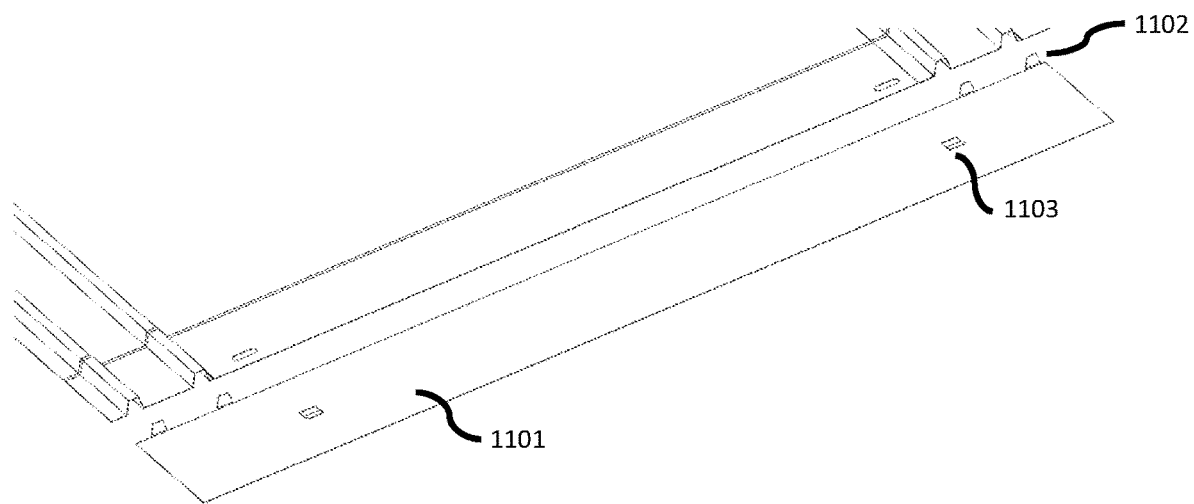
FIG. 11A depicts an eave flashing at the bottom of an alternative configuration of a roof pan.

FIG. 11A is an example of an embodiment of the present invention depicting an eave flashing 1101 that fits under the formed edge 106 of the roof pan 800. This eave flashing 1101 may have multiple tabs 1102 which protrude towards the positive Z direction. Eave flashing 1101 may also have one or multiple eve flashing hems 1103 which fit through the apertures 809 of the raised surface of roof pan 800. When the eave flashing hems 1103 protrude through apertures 809 and eave flashing 1101 is moved down to limit of hem 1103 the eave flashing is secured in place from further movement in the negative Y axis direction. In other example embodiments of the present invention, eave flashing hems 1103 may be formed protrusions that do not leave an aperture in the eave flashing 1101, and still extend through apertures 809 when the eave flashing 1101 is fully installed.

Figure 11B:
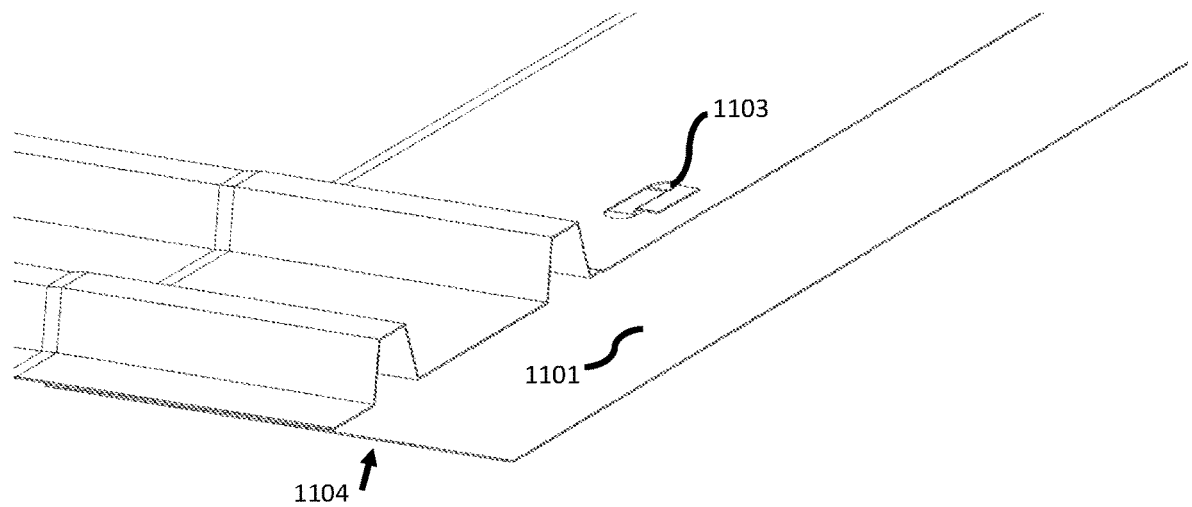
FIG. 11B shows a close-up view of an eave flashing installed underneath a roof pan.

FIG. 11B is a close-up view of connection 1104 in which the eave flashing 1101 fits underneath the formed edge 106 of roof pan 800 and may fit underneath the side flashing 401. The vertical tabs 1102 fits within the cavity made by left side ridges 102. The shape of vertical tab 1102 may have a similar shape to the cross section of left side ridges 102 such that the edges of the vertical tab 1102 substantially fill the cavity of left side ridges 102. Hem 1103 may protrude out of aperture 809 such that the eave flashing 1101 does not slide in the negative Y direction. In other examples of the present invention, the eve flashing hems 1103 may be formed protrusions that extend through apertures 809 that prevent the eave flashing 1101 from moving in the negative Y direction when installed.

Figure 12A:
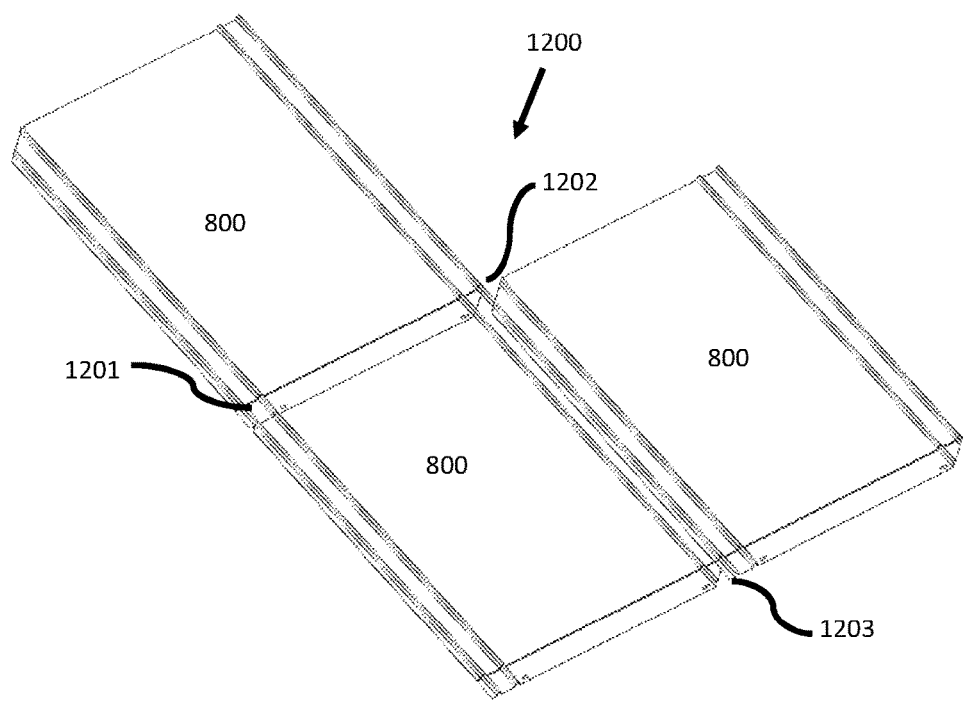
FIG. 12A depicts multiple roof pans configured together such that only one rib is overlapped in the X direction.

FIG. 12A is an example embodiment of the present invention depicting multiple roof pans 800 configured together along the Y axis and X axis of a roof surface into a roof pan array 1200. In other examples of the present invention, multiple roof pans may connect along the X axis, and one or more pans may be skipped within a row. Multiple roof pans may be configured in a rectangular array shape, and "L" array shape, or other configurations. A first and a second roof pan 800 overlap along the Y axis at connection 1201. Three or more roof pans 800 overlap at corner 1202. A first and a second roof pan 800 overlap along the Y axis at connection 1201, where the left-most side ridge 102 of a third roof pan 800 overlaps the outside right-side ridge 103 of a first roof pan 800.

Figure 12B:
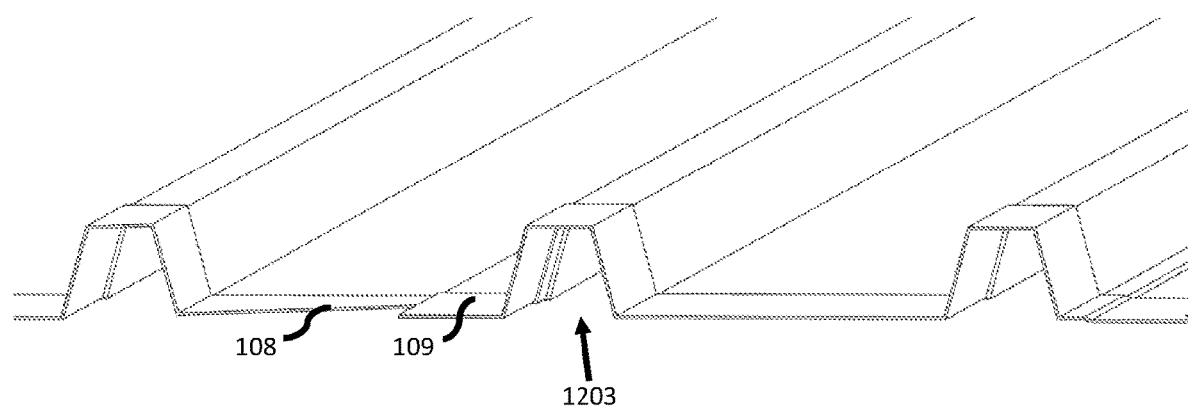
FIG. 12B depicts a close-up view of a connection between two roof pans overlapping.

FIG. 12B depicts a close-up view of connection 1203 in which two roof pans overlap along the Y axis. The bottom left corner 109 overlaps the chamfered right bottom corner 108 of an adjacent roof pan 800. In this configuration, only one of the left side ridges 102 and right side ridges 103 overlap, thereby exposing a total of three ridges. The jog 806 acts as an edge which stops the right most roof pan 800 from moving further down in the Y axis. When multiple the roof pans 800 are installed in this configuration, the width of a row of multiple roof pans 800 can be wider than in the configuration shown in FIG. 9A. Additionally, multiple roof pans 800 in the same row may have different installation configurations to accommodate a desired width of an entire row on an installation surface.

Figure 13A:
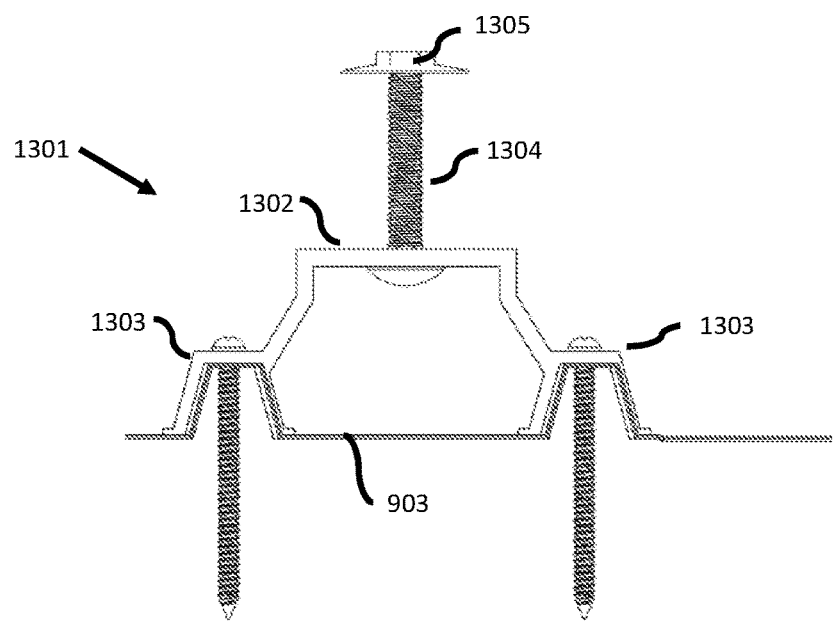
FIG. 13A depicts an alternative configuration of an attachment bracket for additional adjustability.

FIG. 13A is an example of an embodiment of the present invention depicting an attachment bracket 1301 secured to the overlapped corner of two roof pans 800. The base 1303 of the attachment bracket 1301 fits over the ridges of roof pan 800. The base 1303 may have apertures which allow a fastener to pass through to secure the attachment bracket 1301 to the roof pan 800 and the roof surface underneath. Attachment bracket 1301 may have a raised flat surface 1302 which is parallel to the main surface 101 of roof pan 800. Raised flat surface 1302 may have a fastener 1304 which protrudes through a hole or slot, allowing for the fastener to be moved along the X axis.

Figure 13B:
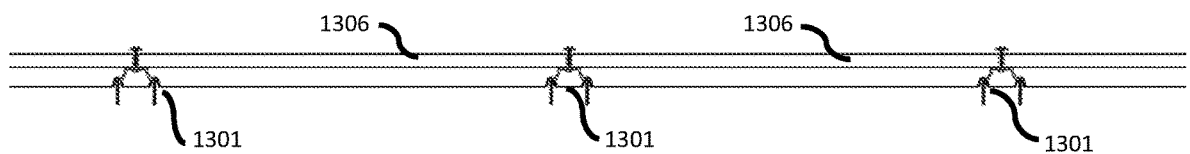
FIG. 13B depicts multiple solar modules secured to an alternative configuration of attachment brackets.

FIG. 13B depicts a possible next installation step from FIG. 13A in which a solar module 1306 of variable length and width is secured to the roof pan 800 by attachment bracket 1301. The bottom edge of solar module 1306 may be placed on raised flat surface 1302. The fastener 1304 may be adjusted to sit flush against the vertical wall of solar module 1306. The same attachment bracket may be used for solar modules of different lengths and widths, due to the adjustability of fastener 1304. The fastener 1304 may have a female fastener 1305 that when threadably engaged in the negative Z direction would secure one or more solar modules 1306 in compression between flat surface 1302 and fastener 1305.

Figure 14A:
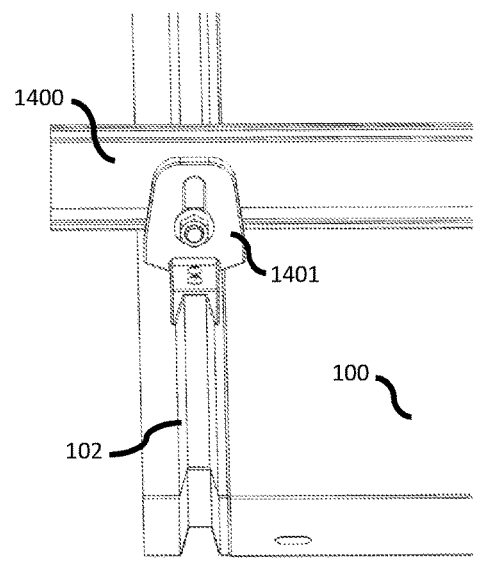
FIG. 14A depicts an alternative configuration showing an attachment bracket for metal rail mounts.

FIG. 14A is an example of an embodiment of the present invention depicting an attachment bracket 1401 secured to the left side ridge 102 or right side ridge 103 of a roof pan 100. A metal rail 1400 used to attach solar modules may be secured to attachment bracket 1401.

Figure 14B:
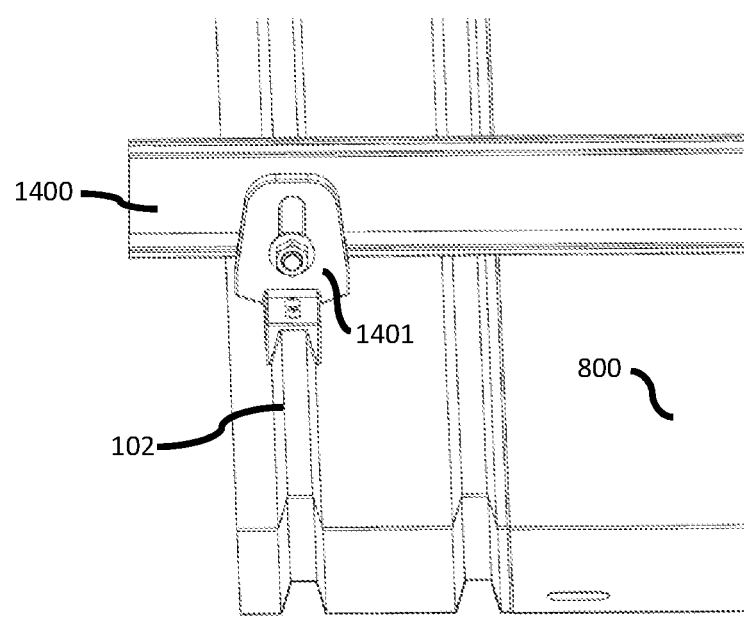
FIG. 14B depicts a second alternative configuration showing an attachment bracket for metal rail mounts.

FIG. 14B is an alternative example of attachment bracket 1401 secured to the raised left side ridge 102 or right side ridge 103 of a roof pan 800. A metal rail 1400 used to attach solar modules may be secured to attachment bracket 1401. Attachment bracket 1401 may be secured over either the left side ridge 102 or right side ridge 103.

Unless specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A roof pan, comprising:
a planar surface;
a left tapered ridge along a first edge of the planar surface, and extending from a third edge of the planar surface to a fourth edge of the planar surface;
a right tapered ridge along a second edge of the planar surface, the right tapered ridge parallel to the left tapered ridge, the right tapered ridge extending from the third edge to the fourth edge, wherein the left tapered ridge of the roof pan overlaps the right tapered ridge of a second roof pan having the same configuration as the roof pan;
a first flange extending from the left tapered ridge along the first edge; and
a formed edge on the fourth edge, the formed edge having an offset away from a roof surface when the roof pan is mounted on the roof surface, the offset allowing a flashing to slide under the formed edge after the roof pan is installed on the roof surface.

2. The roof pan of claim 1, wherein a mounting bracket is disposed over the left tapered ridge of the roof pan, wherein a fastener traverses through the top portion of the left tapered ridge to secure the mounting bracket to the roof surface.

3. The roof pan of claim 1, further comprising a second flange extending from the right tapered ridge along the second edge, the first flange wider than the second flange.

4. The roof pan of claim 1, further comprising:
a first chamfered corner at an intersection of the second edge and the fourth edge.

5. The roof pan of claim 4, further comprising:
a second chamfered corner at an intersection of the first edge and the third edge, the second chamfered corner cooperating with the first chamfered corner of the second roof pan having the same configuration as the roof pan, to eliminate an overlap when multiple roof pans are installed on the roof surface.

6. The roof pan of claim 1, wherein a distance between the left tapered ridge and the right tapered ridge corresponds to a solar module length.

7. The roof pan of claim 1, wherein the left tapered ridge of the roof pan cooperates with the left tapered ridge of the second roof pan having the same configuration as the roof pan, when the roof pan is stacked on the second roof pan for shipping.

8. The roof pan of claim 1, wherein the left tapered ridge of the roof pan overlaps the left tapered ridge of the second roof pan having the same configuration as the roof pan, when the second roof pan slides under the formed edge of the roof pan.

9. The roof pan of claim 1, wherein the offset allows the third edge of the second roof pan having the same configuration as the roof pan to slide under the formed edge.

10. The roof pan of claim 1, further comprising:
a second left tapered ridge along the first edge of the planar surface, the second left tapered ridge parallel to the left tapered ridge and between the left tapered ridge and the right tapered ridge.

11. The roof pan of claim 10, further comprising:
a second right tapered ridge along the second edge of the planar surface, the second right tapered ridge parallel to the right tapered ridge and between the right tapered ridge and the second left tapered ridge.

12. The roof pan of claim 11, wherein a distance between the left tapered ridge and the second right tapered ridge corresponds to a solar module length.

13. The roof pan of claim 11, wherein the left tapered ridge and the second left tapered ridge of the roof pan overlap the right tapered ridge and the second right tapered ridge of the second roof pan having the same configuration as the roof pan.

14. The roof pan of claim 11, wherein a mounting bracket spans across the left tapered ridge and the second left tapered ridge of the roof pan, wherein a fastener on either end of the mounting bracket traverses through each of the left tapered ridge and the second left tapered ridge to secure the mounting bracket to the roof surface.

15. The roof pan of claim 11, wherein the left tapered ridge and the second left tapered ridge of the roof pan overlap the right tapered ridge of the second roof pan having the same configuration as the roof pan.

* * * * *